US008599898B2

(12) United States Patent
Sukhman et al.

(10) Patent No.: US 8,599,898 B2
(45) Date of Patent: Dec. 3, 2013

(54) SLAB LASER WITH COMPOSITE RESONATOR AND METHOD OF PRODUCING HIGH-ENERGY LASER RADIATION

(75) Inventors: Yefim P. Sukhman, Scottsdale, AZ (US); Stefano J. Noto, Mesa, AZ (US); Christian J. Risser, Scottsdale, AZ (US); Mikhail E. Ryskin, Phoenix, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 1818 days.

(21) Appl. No.: 11/021,904

(22) Filed: Dec. 22, 2004

(65) Prior Publication Data

US 2006/0133444 A1    Jun. 22, 2006

(51) Int. Cl.
*H01S 3/06* (2006.01)
*H01S 3/08* (2006.01)

(52) U.S. Cl.
USPC ............................................. 372/99; 372/66

(58) Field of Classification Search
USPC ...................................... 372/99, 66
See application file for complete search history.

(56) References Cited

U.S. PATENT DOCUMENTS

| 3,466,566 | A |   | 9/1969  | Patel et al.       |
|-----------|---|---|---------|--------------------|
| 3,628,178 | A |   | 12/1971 | Treacy             |
| 3,641,458 | A |   | 2/1972  | La Tourrette et al.|
| 3,996,527 | A | * | 12/1976 | Hernqvist ............... 372/99 |
| 4,069,463 | A |   | 1/1978  | McGroddy et al.    |
| 4,103,255 | A |   | 7/1978  | Schlossberg        |
| 4,221,468 | A |   | 9/1980  | Macken             |
| 4,367,554 | A |   | 1/1983  | Schlossberg        |
| 4,433,418 | A |   | 2/1984  | Smith              |
| 4,646,314 | A |   | 2/1987  | Opower             |
| 4,688,228 | A |   | 8/1987  | Newman et al.      |
| 4,703,491 | A |   | 10/1987 | Lim                |

(Continued)

FOREIGN PATENT DOCUMENTS

DE    196 811 33    2/1998
DE    196 55 152    6/2000

(Continued)

OTHER PUBLICATIONS

Tang, X. T. et al. "Optical Phase-Shifted Array Resonator Used in Radio-Frequency-Excited Slab Waveguide CO2 lasers", Opt. Eng 37(1) 1998, pp. 266-271.

(Continued)

*Primary Examiner* — Armando Rodriguez
(74) *Attorney, Agent, or Firm* — Perkins Coie LLP

(57) ABSTRACT

Slab lasers and method for producing high power coherent laser radiation of good quality. In one embodiment, a slab laser comprises a slab laser medium, an energy source configured to deliver energy to the laser medium, and first and second optical elements. The first optical element has a first reflective surface at a first boundary of the laser medium, and the second optical element has a second reflective surface at a second boundary of the laser medium. The first and second reflective surfaces face each other across the length of the laser medium, and at least one of the first and second optical elements includes a plurality of reflective regions configured to modify the phase distribution of the incident laser radiation propagating from the reflective regions. The first and second reflective surfaces are also positioned at an angle relative to each other to form a laser resonator.

50 Claims, 4 Drawing Sheets

(56) References Cited

U.S. PATENT DOCUMENTS

| | | | |
|---|---|---|---|
| 4,719,639 A * | 1/1988 | Tulip | 372/66 |
| 4,939,738 A | 7/1990 | Opower | |
| 4,972,427 A * | 11/1990 | Streifer et al. | 372/92 |
| 5,001,719 A | 3/1991 | Trussell | |
| 5,014,282 A | 5/1991 | Herziger et al. | |
| 5,029,173 A * | 7/1991 | Seguin | 372/23 |
| 5,048,048 A | 9/1991 | Nishimae et al. | |
| 5,051,558 A | 9/1991 | Sukhman | |
| 5,058,122 A | 10/1991 | Gekat | |
| 5,123,028 A * | 6/1992 | Hobart et al. | 372/95 |
| 5,151,917 A | 9/1992 | Perilloux | |
| 5,327,449 A | 7/1994 | Du et al. | |
| 5,333,077 A | 7/1994 | Legar et al. | |
| 5,335,242 A | 8/1994 | Hobart et al. | |
| 5,353,297 A | 10/1994 | Koop | |
| 5,373,525 A | 12/1994 | Nowack et al. | |
| 5,386,431 A | 1/1995 | Tulip | |
| 5,412,681 A | 5/1995 | Eisel et al. | |
| 5,608,745 A | 3/1997 | Hall | |
| 5,661,746 A | 8/1997 | Sukhman | |
| 5,754,575 A | 5/1998 | Sukhman et al. | |
| 5,867,517 A | 2/1999 | Sukhman et al. | |
| 5,881,087 A | 3/1999 | Sukhman et al. | |
| 5,894,493 A | 4/1999 | Sukhman et al. | |
| 5,901,167 A | 5/1999 | Sukhman et al. | |
| 5,982,803 A | 11/1999 | Sukhman et al. | |
| 6,181,719 B1 | 1/2001 | Sukhman et al. | |
| 6,215,807 B1 | 4/2001 | Reilly | |
| 6,313,433 B1 | 11/2001 | Sukman | |
| 6,327,285 B1 | 12/2001 | Wang | |
| 6,342,687 B1 | 1/2002 | Sukhman et al. | |
| 6,423,925 B1 | 7/2002 | Sukhman et al. | |
| 6,424,670 B1 | 7/2002 | Sukhman et al. | |
| 6,704,333 B2 | 3/2004 | Tulip | |
| 6,876,679 B1 * | 4/2005 | Bowler et al. | 372/9 |
| 6,983,001 B2 | 1/2006 | Sukhman et al. | |
| D517,474 S | 3/2006 | Sukhman et al. | |
| 7,060,934 B2 | 6/2006 | Risser et al. | |
| 7,415,051 B1 | 8/2008 | Risser et al. | |
| 2003/0174208 A1 | 9/2003 | Glukhovsky | |
| 2004/0022296 A1 | 2/2004 | Sukhman | |
| 2004/0136424 A1 * | 7/2004 | Shveykin | 372/44 |

FOREIGN PATENT DOCUMENTS

| | | |
|---|---|---|
| JP | 2001044536 | 2/2001 |
| JP | 2001053360 | 2/2001 |
| WO | WO-97/15101 | 4/1997 |
| WO | WO 00/77894 A1 | 12/2000 |
| WO | WO-01/76805 | 10/2001 |
| WO | WO 2004/068656 A2 | 8/2004 |

OTHER PUBLICATIONS

Wells, W.H., "Modes of a Tilted-Mirror Optical Resonator for The Far Infrared", J. Quantum Electronics, May 1966, pp. 94-102, QE-2, No. 5, Institute of Electrical and Electronics Engineers, New York, N.Y.

Siegman, A.E., "Laser Beams and Resonators: The 1960's", IEEE Journal on Selected Topics in Quantum Electronics, vol. 6, No. 6, 2000, pp. 1380-1388.

Siegman, A.E., Lasers (University Science) 1986.

Written Opinion for PCT/US05/39159; Applicant: Universal Laser Systems, Inc., dated: Aug. 1, 2008;10 pgs; IPEA/US.

* cited by examiner

SLAB LASER WITH COMPOSITE RESONATOR AND METHOD OF PRODUCING HIGH-ENERGY LASER RADIATION

TECHNICAL FIELD

The present invention relates to systems for generating coherent light and particular embodiments of the invention are directed to slab lasers having a resonator containing a plurality of reflective regions configured to modify the phase distribution of the incident laser radiation.

BACKGROUND

Lasers are ubiquitous devices used for testing, measuring, printing, cutting, marking, medical applications, communications, data transmission, semiconductor processing, and many other applications. Many types of lasers have been developed to meet different performance criteria for different applications. Engraving, cutting, marking, printing and many other applications require relatively compact lasers that generate high power output and have beams with a desired shape and energy distribution. Slab lasers are often useful in such applications because they can generate high power output in a relatively compact package.

Gas slab lasers generally have a gas containment structure, a pair of elongated electrodes juxtaposed to each other across a gap, and mirrors at each end of the electrodes forming a laser resonator. Slab lasers also have an active laser medium in the volume between the electrodes that defines the "slab." In operation, slab lasers generate a beam of coherent light by extracting energy from an energized active laser medium using a laser resonator.

Although slab lasers are useful for many applications, it is difficult to extract a beam of good quality. More specifically, because the active laser medium has a rectilinear configuration, it produces an elliptical beam with different properties along a minor axis in the direction of the slab height and an orthogonal major axis in the direction of the slab width. In the narrow direction corresponding to the slab height, the reflecting surfaces of the electrodes can create a waveguide that defines the structure and divergence of the beam. Whereas in the orthogonal direction corresponding to the slab width, the beam is not restricted by the electrodes such that the properties of the beam are mainly defined by the properties of the laser resonator.

Extracting a good quality high-power laser beam from a slab laser is a complex problem that has been the subject of numerous inventions for many years. Several U.S. patents disclose devices and processes that attempt to obtain a good quality beam. For example, U.S. Pat. Nos. 4,719,639; 5,123,028; and 5,353,297 disclose different types of stable and/or unstable resonators for slab lasers that seek to improve the beam quality. The lasers in accordance with these patents, however, still produce elliptical beams with different divergence values along the orthogonal axes.

Other types of laser resonators have been developed to produce a high quality coherent beam from a slab that has a non-circular shape. For example, resonators disclosed in U.S. Pat. Nos. 4,972,427 and 5,608,745 use the Talbot effect for efficient selection of a single mode. Although the lasers disclosed in these patents produce high power outputs, their beam characteristics may not be acceptable for many material processing applications.

Another aspect of slab lasers is generating a high power output in a compact laser. U.S. Pat. No. 5,661,746 issued to Sukhman et al. discloses a multiple pass stable resonator that generates a high power output with good beam quality from a slab laser. The slab laser disclosed in U.S. Pat. No. 5,661,746 is a free-space laser that eliminates, or at least substantially mitigates, the waveguide effect of the electrodes. Additionally, the devices and methods disclosed in U.S. Pat. No. 5,661,746 produce a high power output because the beam propagates along multiple passes between the optical elements to effectively use the active laser medium. However, due to development of an internal parasitic mode as the number of passes inside the lasers is increased, lasers of this type are limited in power output.

DETAILED DESCRIPTION

A. Overview

The present invention is directed toward lasers and methods of operating lasers for engraving, cutting, printing, welding and many other applications. Several specific embodiments of lasers in accordance with the invention are set forth in FIGS. 1-4 and the following text to provide a thorough understanding of particular lasers and methods for generating a coherent beam of radiation. The invention, however, may have additional embodiments of lasers, or the invention may be practiced without several details of the embodiments shown and described below with reference to FIGS. 1-4.

Several aspects of the invention are directed toward slab lasers. In one embodiment, a slab laser comprises a slab laser medium, an energy source configured to deliver energy to the laser medium, and first and second optical elements. The first optical element has a first reflective surface at a first boundary of the laser medium, and the second optical element has a second reflective surface at a second boundary of the laser medium. The first and second reflective surfaces generally face each other across the length of the laser medium, and at least one of the first and second optical elements includes a plurality of reflective regions configured to modify the phase distribution of the incident laser radiation. The first and second reflective surfaces are also positioned at an angle relative to each other to form a laser resonator.

Another embodiment of a slab laser comprises a slab laser medium, a system configured to deliver energy to the laser medium, and a resonator assembly having first and second optical elements facing each other across the length of the laser medium. The first optical element has a first reflective surface, and the second optical element has a second reflective surface. Additionally, at least the second optical element includes a plurality of reflective regions configured to modify the phase distribution of the incident laser radiation having optical axes spaced apart from each other along the width of the laser medium. For example, the reflective regions can comprise concave reflectors (e.g., spherical reflectors, aspherical reflectors, cylindrical reflectors, etc.), or other types of devices that modify the phase distribution of the incident laser radiation (e.g., a diffraction grating).

Figure 1:
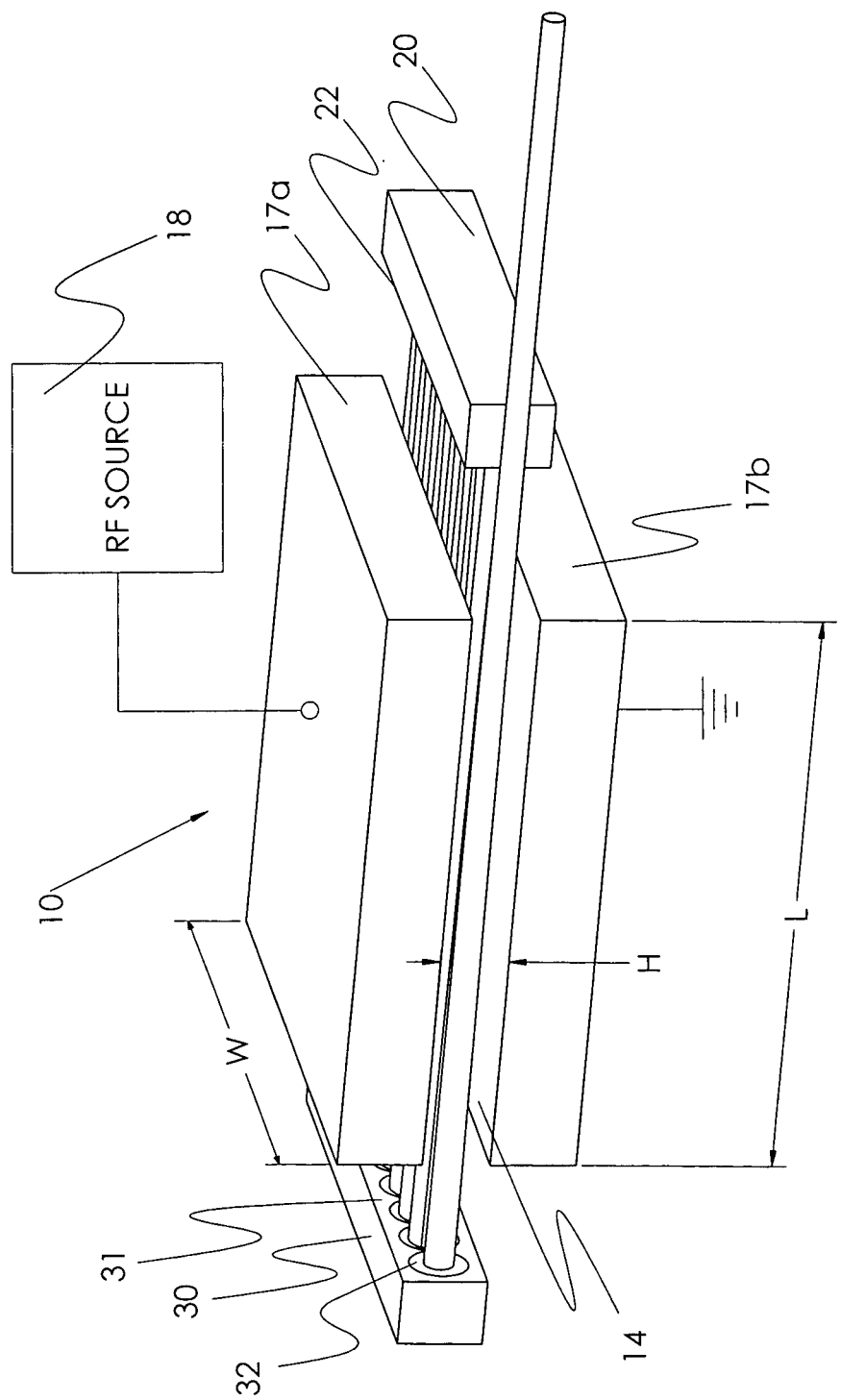
FIG. 1 is a view of a laser in accordance with an embodiment of the invention.

Other aspects of the invention are directed towards methods of producing high-energy coherent beams of radiation. One embodiment of such a method includes energizing a slab laser medium and generating a periodical energy distribution inside the laser resonator which propagates beyond the edge one of the optical element forming an output beam B. Specific Embodiments Of Lasers FIG. 1 is a view of a laser 10 in accordance with one embodiment of the invention. The laser 10 includes a gas containment structure (not shown), an active laser medium 14 in the gas containment structure, and an energy source 18 configured to energize the laser medium 14. The active laser medium 14 in the embodiment shown in FIG. 1 is a slab laser medium having a length L (shown in FIG. 1), a width W (shown in FIG. 1), and a height H (shown in FIG. 1). The active laser medium 14 can be gas, solid state, or liquid depending upon the particular application. In the case of gas slab lasers, the energy source 18 illustrated in FIG. 1 is an RF energy source attached to a first electrode 17a, a second electrode 17b. The first and second electrodes 17a-b have a length and width corresponding generally to the length L and width W of the slab laser medium 14. The first and second electrodes 17a-b are spaced apart by a gap corresponding to the height H of the laser medium 14. The first and second electrodes 17a-b, for example, can be spaced apart by a distance such that the laser resonator 12 (also shown in FIGS. 2-4) operates as a free-space laser in each of the dimensions corresponding to the length L, width W, and height H of the laser medium 14. In other embodiments, the first and second electrodes 17a-b can be spaced apart by a smaller distance such that the interior surfaces of the first and second electrodes 17a-b act as a waveguide. In alternative embodiments, the energy source 18 can be a light source or a microwave generator to deliver other forms of energy to the active laser medium in accordance with the particular type of laser.

The laser 10 further includes a first optical element 20 at a first boundary of the laser medium 14 and a second optical element 30 at a second boundary of the laser medium 14. The first and second optical elements 20 and 30 generally face each other along the length L of the laser medium 14. The first optical element 20 includes a first reflective surface 22 facing generally towards the second optical element 30, and the second optical element 30 includes a second surface 31 and a plurality of reflective regions 32 along the second surface 31. The first surface 22 of the first optical element 20, the second surface 31 of the second optical element 30, and the reflective regions 32 along the second surface 31 are generally totally reflective, but in some embodiments one or more of these features may be non-reflective to a certain extent.

The reflective regions 32 face toward the first reflective surface 22 of the first optical element 20. The reflective regions 32 shown in FIG. 1 are individual depressions or indentations at locations along the second optical element 30, but they can alternatively be other types of reflective components. The reflective regions 32 in the embodiment shown in FIG. 1 are also adjacent to each other, but in other embodiments the reflective regions 32 can be spaced apart from each other along the second surface 31. The reflective regions 32, for example, can be spherical, cylindrical, aspherical, and/or other types reflectors with other curvatures or diffraction gratings configured to modify the phase distribution of the incident laser radiation in the laser medium 14 propagating from the reflective regions. Several specific embodiments of the invention are described below with reference to FIGS. 1-4.

C. Specific Embodiments Of The Invention

Figure 2:
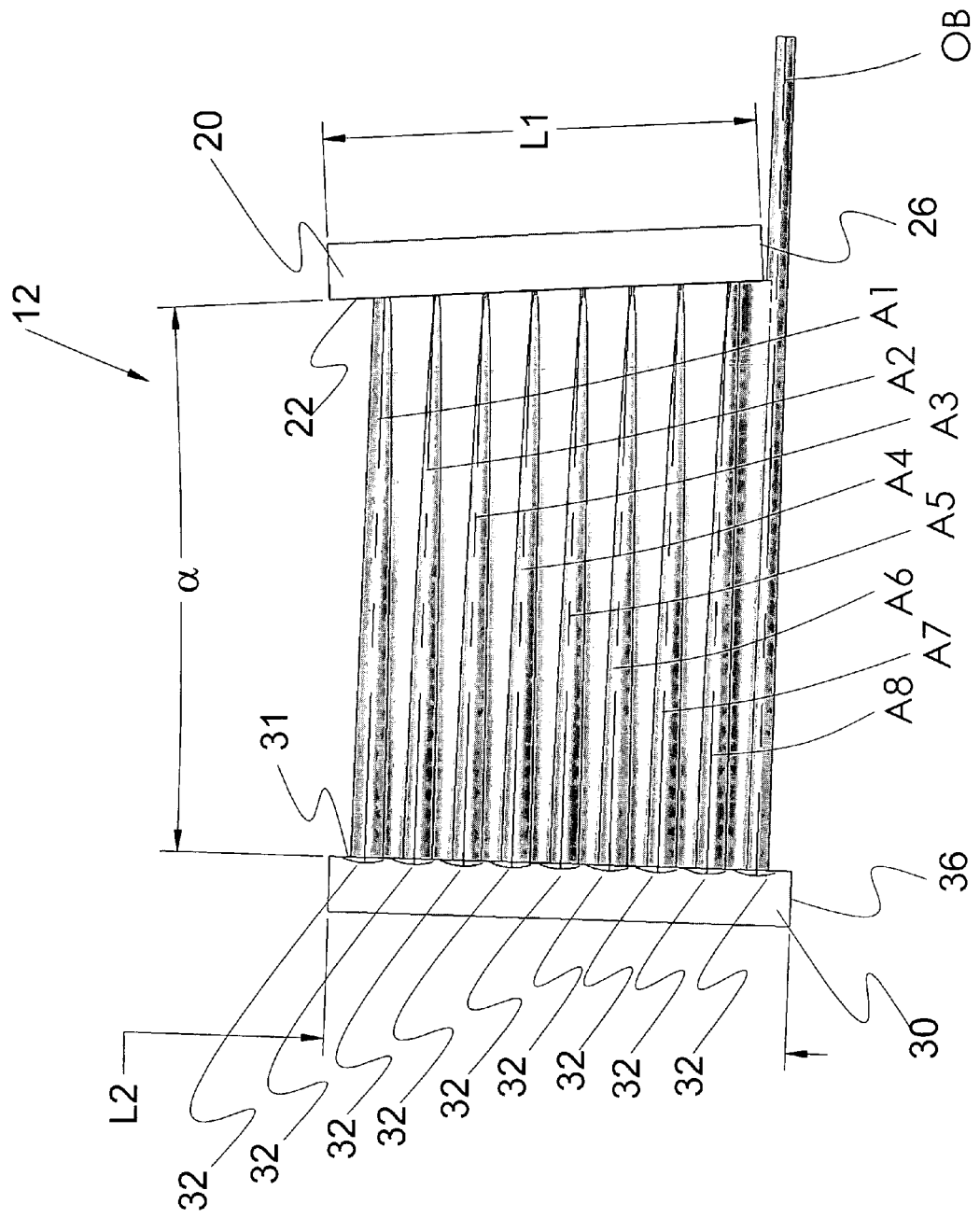
FIG. 2 is a top view of the laser illustrated in FIG. 1 with the electrodes 17a and 17b removed to better illustrate the resonator and beams.

FIG. 2 is a top view of the laser illustrated in FIG. 1 with the electrodes 17a and 17b removed to better illustrate the resonator and beams. In one embodiment, the second optical element 30 includes spherically shaped reflective regions 32. The reflective regions 32 can have identical shapes along the length L2 of the second optical element 30, but in several alternative embodiments one or more reflective regions 32 can have a different contour or shape than the other reflective regions. The reflective regions 32 shown in FIG. 2 have optical axes A1-A8 that extend at least substantially parallel to each other along the length of the laser medium. In other embodiments, however, the optical axes A1-A8 can be inclined toward or away from each other. Additionally, the first reflective surface 22 of the first optical element 20 and the reflective regions 32 are arranged such that the optical axes A1-A8 extend at an inclined angle relative to the first reflective surface 22. In the embodiment shown in FIG. 2, for example, the first reflective surface 22 is inclined at an oblique angle $\alpha$ relative to the reflective regions 32. The first and second optical elements 20 and 30 accordingly have diverging ends 26 and 36, respectively. In alternative embodiments, both the first optical element 20 and the second optical element 30 are inclined to provide the desired relative angle between the first reflective surface 22 and the reflective regions 32, or just the second optical element 30 can be inclined.

The angle $\alpha$ generally depends upon the dimensions of the laser medium 14 and the dimensions of the individual reflective regions 32. In one particular embodiment, for example, the present inventors have found that an angle of approximately 0.5 mrad is suitable for use with (a) an active laser medium having a length of approximately 60 cm and a height of approximately 4.3 mm, and (b) spherical reflective regions having a radius of curvature of approximately 4 m and diameter of approximately 6 mm. This particular embodiment is an example of only one suitable configuration for the first and second optical elements 20 and 30, and many other configurations with other dimensions are within the scope of the present invention depending upon the type of laser medium 14 (FIG. 1), energy source, optical elements, dimensions, and other factors.

Referring still to FIG. 2, the first optical element 20 can have a length L1 and the second optical element 30 can have a length L2 greater than length L1. This configuration enables an output beam OB to be extracted from the laser 10 beyond the end 26 of the first optical element 20. As a result, when the laser medium is composed of a gas or liquid, the laser 10 can further include a transparent window (not shown) through which the output beam OB exits the laser 10 while containing the gas or liquid. In an alternative embodiment, the length L1 of the first optical element 20 can be greater than the length L2 of the second optical element 30 such that the output beam OB exits the laser in the opposite direction. In another potential embodiment, the length L1 of the first optical element 20 can be equal to the length L2 of the second optical element 30 when the angle $\alpha$ between the first and second optical elements 20 and 30 is large enough to direct the output beam OB past the end of the opposing optical element.

Figure 3:
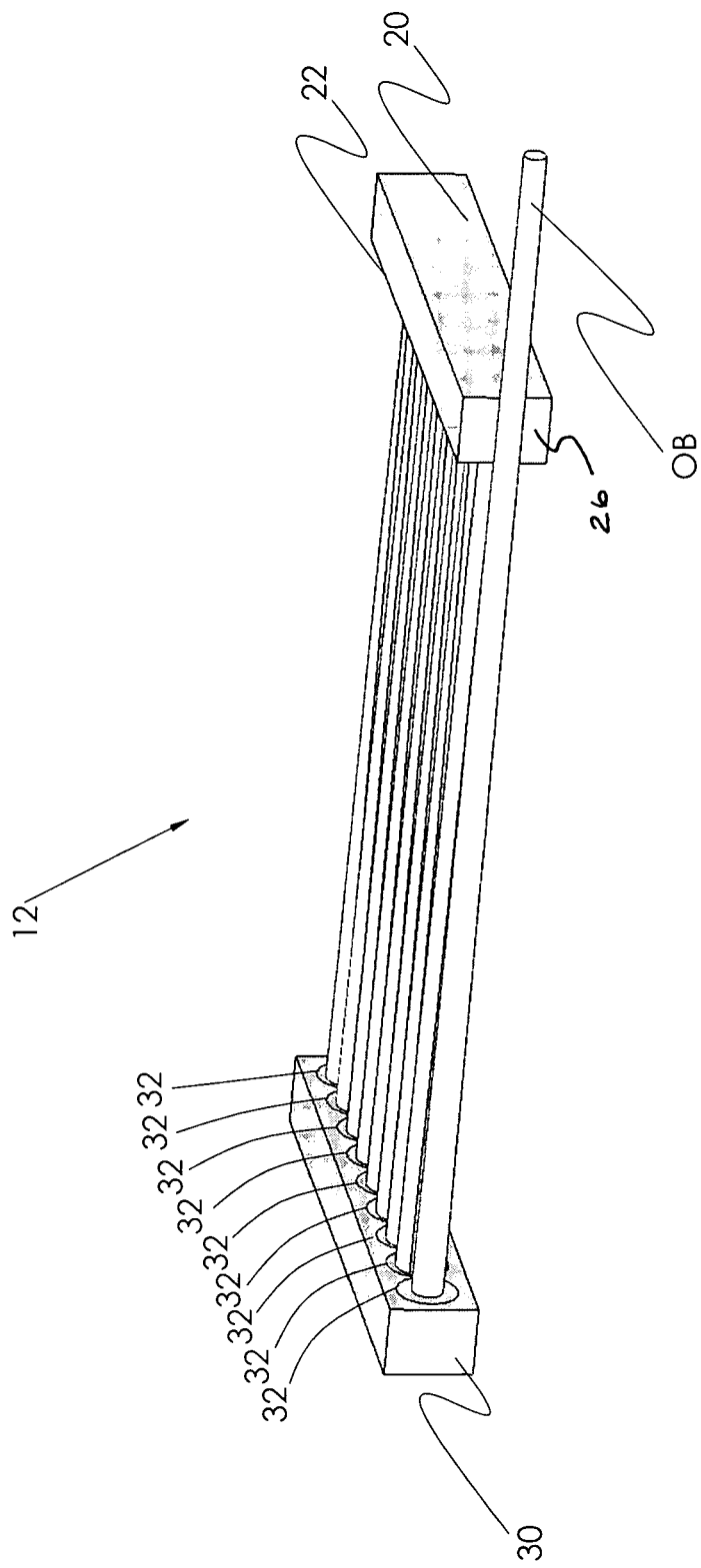
FIG. 3 is an isometric view of the laser illustrated in FIG. 1 with the electrodes 17a and 17b removed to better illustrate the resonator and beams.

The following discussion with respect to FIGS. 2 and 3 regarding the operation of the laser 10 is merely illustrative and not intended to be limiting. In operation, the power source 18 (FIG. 1) energizes the active laser medium 14 (FIG. 1). When the active laser medium is energized, the first optical element 20 and the plurality of reflective regions 32 on the second optical element 30 positioned at an angle alpha relative to each other produce a laser resonator characterized by a periodical energy distribution inside the laser resonator which propagates beyond the edge 26 of optical element 20 forming an output beam.

Several embodiments of the laser 10 produce high power output for the length L of the active laser medium 14. First, unlike multiple-pass lasers that reflect a single beam back and forth between end-mirrors along a plurality of passes, the laser 10 produces a plurality of internal beams within the laser medium that are at least substantially parallel to each other. Second, the internal beams propagate from the reflective regions 32 at an angle relative to at least one of the optical elements. As a result, the energy of the internal beams is believed to have a conjunctive effect forming an output beam.

Still another advantage of several embodiments of the laser 10 is that the output beam can be of high quality with a desired power distribution. Unlike most slab lasers that produce an elliptically shaped output beam with different power distributions along the orthogonal minor and major axes, the output beam produced by the laser 10 is more circular and has at least a substantially uniform power distribution along different diameters of the beam. The output beam of the laser 10 accordingly provides a high quality beam that is highly suitable for material processing applications.

In another embodiment of this invention, the reflective regions 32 in FIG. 3 can have an aspheric surface, such as an elliptical or parabolic surface. In still another embodiment of this invention the reflective regions 32 of the second optical element 30 in FIG. 3 can be cylindrical extending across the second optical element 30 in the direction of the height H of the laser medium 14 (FIG. 1) with either a circular or parabolic curvature.

Figure 4:
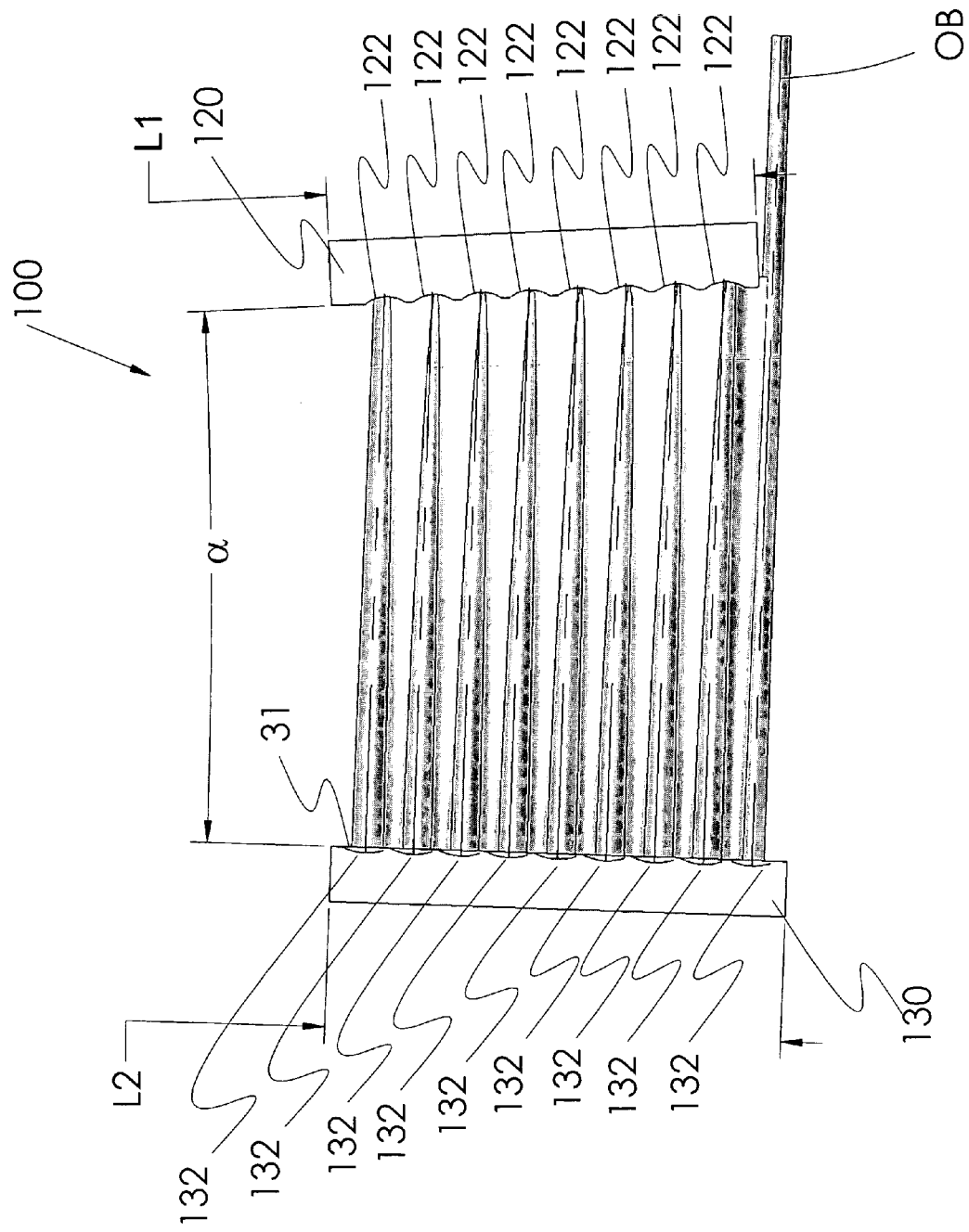
FIG. 4 is a top view still another embodiment of the laser illustrated in FIG. 1 with the electrodes 17a and 17b removed to illustrate show the resonator and beams.

FIG. 4 is a top view still another embodiment of the laser illustrated in FIG. 1 with the electrodes 17a and 17b removed to illustrate the resonator and beams. In this embodiment, the laser 100 includes a first optical element 120 that has a plurality of first reflective regions 122 and a second optical element 130 that has a plurality of second reflective regions 132. The first reflective regions 122 and the second reflective regions 132 can be similar to any of the reflective regions 32 described above. The first and second reflective regions 122 and 132 can have the same general structures on both the first optical element 120 and the second optical element 130. In other embodiments, the first reflective regions 122 can have a different shape than the second reflective regions 132. For example, in the particular embodiment illustrated in FIG. 4, the first reflective regions 122 are cylindrical reflectors extending across the thickness of the first optical element 120 and the second reflective regions 132 are spherical reflectors on the second optical element 130. In alternative embodiments, any combination of the foregoing reflective regions described above with reference to FIGS. 1-4 can be used for the first and second optical elements 120 and 130.

The output beam achieved by the authors in experiments with the resonator described in this invention combined with a 2000 watt RF power supply and producing up to 250 watts of coherent laser energy with good beam quality suitable for a wide variety of material processing applications.

From the foregoing, it will be appreciated that specific embodiments of the invention have been described herein for purposes of illustration, but that various modifications may be made without deviating from the spirit and scope of the invention. For example, even though several embodiments of the lasers shown in FIGS. 1-4 have eight reflective regions, the first and/or second optical elements can have any suitable number of two or more reflective regions. Additionally, the optical axes of the reflective regions may be inclined at one or more angles to each other such that the internal beams converge toward and/or diverge away from adjacent beams. Accordingly, the invention is not limited except as by the appended claims.

We claim:

1. A laser for material processing applications, the laser comprising:
    a slab laser medium;
    an energy source configured to deliver energy to the laser medium and produce a plurality of individual internal beams; and
    a first optical element at a first boundary of the laser medium and a second optical element at a second boundary of the laser medium, the first optical element having a first reflective surface and the second optical element having a second reflective surface, wherein at least one of the first and/or second optical elements includes a plurality of reflective regions, and wherein the first reflective surface and the second reflective surface are positioned at a non-parallel angle to each other to form a laser resonator,
    wherein the laser resonator is configured to incoherently combine the individual internal beams to form an output laser beam.

2. The laser of claim 1 wherein the reflective regions are adjacent to each other along at least one of the first and/or second reflective surfaces.

3. The laser of claim 1 wherein the reflective regions comprise concave reflectors along at least one of the first and/or second reflective surfaces.

4. The laser of claim 1 wherein the reflective regions comprise spherical reflectors along at least one of the first and/or second reflective surfaces.

5. The laser of claim 1 wherein the reflective regions comprise aspheric reflectors along at least one of the first and/or second reflective surfaces.

6. The laser of claim 1 wherein the reflective regions comprise cylindrical reflectors along at least one of the first and/or second reflective surfaces.

7. The laser of claim 1 wherein the reflective regions have common optical powers.

8. The laser of claim 1 wherein different individual reflective regions have different optical powers.

9. The laser of claim 1 wherein the reflective regions have identical dimensions.

10. The laser of claim 1 wherein different individual reflective regions have different dimensions.

11. The laser of claim 1 wherein the first and second reflective surfaces are total reflectors.

12. The laser of claim 1 wherein at least one of the first and/or second optical elements comprises more than one reflective surface.

13. The laser of claim 1 wherein the first reflective surface is at one end of a lengthwise dimension of the laser medium and has a first dimension along a widthwise dimension of the laser medium, and the second reflective surface is at an opposing end of the lengthwise dimension of the laser medium and has a second dimension along the widthwise dimension of the laser medium, and wherein the first widthwise dimension is less than the second widthwise dimension.

14. The laser of claim 13 wherein the first and second optical elements each comprise a plurality of reflective regions characterized by optical power.

15. The laser of claim 14 wherein the reflective surface of one optical element is a cylindrical surface extending parallel to a first direction and the plurality of reflective regions of the second optical element are cylindrical surfaces normal to the first direction.

16. The laser of claim 14 wherein the reflective surface of the first optical element is flat and the second optical element has a plurality of spherical reflective regions.

17. The laser of claim 14 wherein the reflective surface of the first optical element is flat and the second optical element has a plurality of aspheric reflective regions.

18. The laser of claim 1 wherein the laser medium comprises a solid state material, a liquid, or a gas.

19. The laser of claim 1 wherein the energy source comprises a light source, an RF source, a microwave source or a DC power source.

20. The laser of claim 1 wherein the laser resonator parameters define a free space resonator operation in any direction.

21. The laser of claim 1 wherein the laser resonator parameters define a waveguide resonator operation in the direction of the height of the laser medium and a free space resonator operation in the direction of the width of the laser medium.

22. A laser for material processing applications, the laser comprising:
  a slab laser medium having a length, a width and a height;
  an energy source configured to energize the laser medium; and
  a resonator assembly having a first optical element with a first reflective surface and a second optical element with a second reflective surface, the first and second reflective surfaces being totally reflective, and the first and second reflective surfaces being (a) arranged to face each other across the length of the laser medium and (b) positioned at a non-parallel angle relative to each other along the width of the laser medium, wherein at least one of the first or second reflective surfaces contains plurality of reflective regions configured to modify a phase distribution of the incident laser radiation to form a laser resonator,
  wherein the laser resonator is configured to use incoherent combining of the laser radiation to form an output laser beam having a generally circular cross-sectional shape and a generally uniform power distribution across a diameter of the output beam.

23. The laser of claim 22 wherein the second optical element includes reflective regions having individual optical axes that are at least substantially parallel to each other and perpendicular to the second reflective surface of the second optical elements, and wherein the optical axes are at a non-parallel angle relative to the first reflective surface of the first optical element.

24. The laser of claim 22 wherein the second optical element includes reflective regions having individual optical axes at different angles between each other along the width of the laser medium.

25. A laser for material processing applications, the laser comprising:
  a slab laser medium;
  an energy source configured to deliver energy to the laser medium and produce a plurality of internal laser beams;
  a reflective first optical element at a first boundary of the laser medium, the first optical element having a first reflective surface;
  a second optical element at a second boundary of the laser medium, the second optical element having a second surface; and
  a plurality of discrete reflective elements on at least one of the first and/or second optical elements, wherein the reflective elements have optical axes extending at a non-parallel angle relative to an opposing one of the first and/or second reflective surfaces to form a laser resonator,
  wherein the laser resonator is configured to incoherently combine the individual internal laser beams into a single output laser beam.

26. The laser of claim 25 wherein the reflective elements comprise indentations at locations along the second optical element.

27. The laser of claim 25 wherein the reflective elements comprise concave reflectors along the second optical element.

28. The laser of claim 25 wherein the reflective elements comprise spherical reflectors along the second optical element.

29. The laser of claim 25 wherein the reflective elements comprise aspheric reflectors along the second optical element.

30. The laser of claim 29 wherein the aspheric reflectors have ellipsoid surfaces.

31. The laser of claim 25 wherein the reflective elements comprise cylindrical reflectors along the second optical element.

32. The laser of claim 25 wherein the reflective elements comprise curved reflective surfaces having a common curvature.

33. The laser of claim 25 wherein the reflective elements comprise a first reflector having a first curved surface with a first curvature configured to provide a first optical power and a second reflector having a second curved surface with a second curvature configured to provide a second optical power different than the first optical power.

34. The laser of claim 25 wherein second optical element further comprises a second reflective surface, and the reflective elements are along the second reflective surface.

35. The laser of claim 25 wherein the first reflective surface of the first optical element and the second surface of the second optical element are approximately totally reflective.

36. The laser of claim 25, further comprising a non-reflective window through which the output beam propagates from the laser medium.

37. The laser of claim 25 wherein the first optical element is at one end of a lengthwise dimension of the laser medium and has a first dimension along a widthwise dimension of the laser medium, and the second optical element is at an opposing end of the lengthwise dimension of the laser medium and has a second dimension along the widthwise dimension of the laser medium, and wherein the first dimension is less than the second dimension.

38. The laser of claim 25 wherein the first and second optical elements each include a plurality of reflective elements.

39. The laser of claim 38 wherein the reflective elements on the first optical element are cylindrical surfaces extending parallel to a first direction and the reflective elements on the second optical element are spherical surfaces.

40. The laser of claim 25 wherein the laser medium comprises a solid state material, a liquid, or a gas.

41. The laser of claim 25 wherein the energy source include a light source, an RF source, a microwave source, or a DC source.

42. The laser of claim 25 wherein the laser medium has a length, a width and a height defining an enclosure that provides a free space operation of the laser resonator in any direction.

43. The laser of claim 25 wherein the laser medium has a length, a width and a height defining an enclosure that provides a waveguide operation of the laser resonator in the direction of the height of the laser medium and a free space operation of the laser resonator in the direction of the width of the laser medium.

44. A laser for material processing applications, the laser, comprising:
- a slab laser medium having a length, a width, and a height;
- a system for delivering energy to the laser medium; and
- a resonator assembly having a first optical element with a first reflective surface and a second optical element with a second reflective surface facing the first reflective surface across the length of the laser medium, wherein the first and second reflective surfaces are positioned at a non-parallel angle relative to each other, and wherein at least the second optical element includes a plurality of optical regions having parallel optical axes spaced apart from each other along the width of the laser medium,
- wherein the first optical element and the optical regions of the second optical element are configured to produce a periodical energy distribution inside the resonator assembly that propagates beyond the edge of one of the first or second optical elements and forms an output laser beam,
- wherein the resonator assembly is configured to utilize incoherent combining to form the output beam.

45. The laser of claim 44 wherein the optical regions are adjacent to each other along at least one of the first and/or second optical elements.

46. The laser of claim 44 wherein the optical regions have common optical powers.

47. The laser of claim 44 wherein different individual optical regions have different optical powers.

48. The laser of claim 44 wherein the first and second optic elements are total reflectors.

49. The laser of claim 44 wherein the first reflective surface is at one end of a lengthwise dimension of the laser medium and has a first dimension along a widthwise dimension of the laser medium, and the second reflective surface is at an opposing end of the lengthwise dimension of the laser medium and has a second dimension along the widthwise dimension of the laser medium, and wherein the first widthwise dimension is different than the second widthwise dimension.

50. A laser for material processing applications, the laser, comprising:
- a slab laser medium having a length, a width and a height;
- an energy source configured to energize the laser medium and produce a plurality of individual internal beams; and
- a resonator assembly having a first optical element with a reflective first side proximate to one end along the length of the laser medium and a second optical element with a reflective second side proximate to an opposing end along the length of the laser medium, the first side being at a non-parallel angle with respect to the second side, and at least the second side having a plurality of concave indentations,
- wherein the resonator assembly is configured to incoherently combine the individual internal beams to form an output laser beam.

* * * * *